Aug. 25, 1964   D. P. SMITH   3,145,416
POULTRY SHACKLE
Filed July 20, 1962
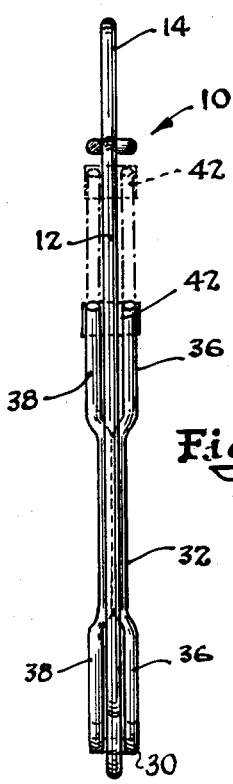
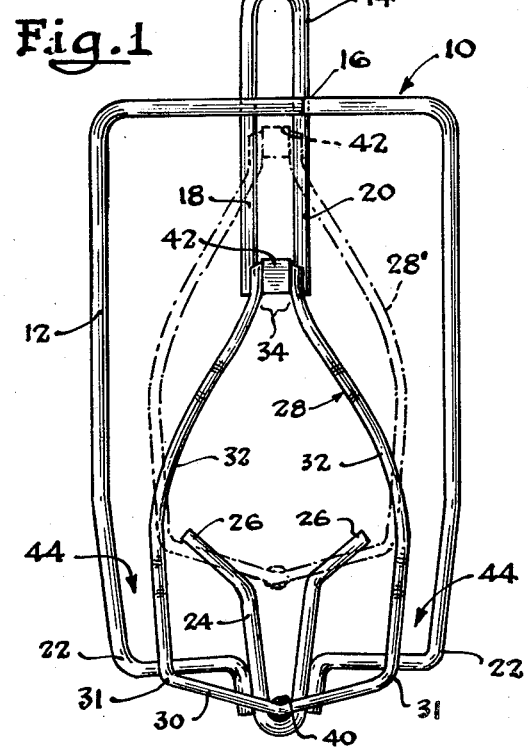
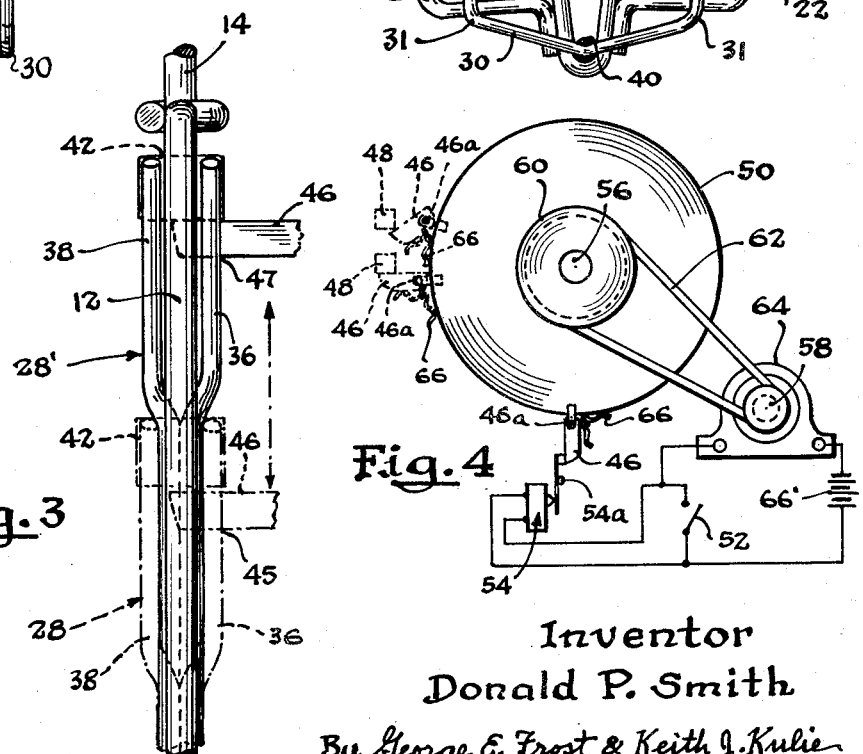
Inventor
Donald P. Smith
By George E. Frost & Keith J. Kulie
Attorneys 大专利号 3,145,416
专利日期 Aug. 25, 1964

United States Patent Office 3,145,416
POULTRY SHACKLE
Donald P. Smith, 4530 Woodfin Drive, Dallas 20, Tex.
Filed July 20, 1962, Ser. No. 211,225
2 Claims. (Cl. 17—44.1)

The present invention relates to a shackle for supporting fowl or poultry, such as chickens and turkeys, on a moving overhead conveyor and more particularly it relates to an improved shackle adapted for automatically releasing a supported fowl at the proper point of conveyor travel.

Poultry or fowl shackles are employed in the processing of fowl to support the birds during the performance of the various processing operations such as killing, scalding, defeathering, eviscerating, inspecting, and the like. The fowl are suspended in spaced relation on the moving elevated conveyor and thus are conveyed between the stations where these successive operations are performed. At the end of the travel, the birds are removed from the shackles for washing, packaging, freezing, and similar steps.

The processing of fowl for the market of economical necessity is accomplished on a production line basis wherein the fowl are suspended from the shackles and carried by moving conveyor lines. Several of the steps in the processing of fowl require the birds to be placed in a substantially horizontal position while other steps direct that the bird be placed in a substantially vertical position. Thus, a shackle adapted to conveniently accommodate the various positioning requirements of the various processing operations can be employed more effectively than one not so constructed.

Most of the development work done on poultry shackles has been directed toward the development of satisfactory shackles for use in the defeathering operation. Very little work has been directed toward development of a shackle for evisceration or of a shackle that could be employed for both defeathering and evisceration.

It should be noted that in defeathering of poultry, the only requirement is that a means be provided to hold the bird by either the legs or the neck so that the picking fingers may pass over the remainder of the body of the bird to remove the feathers therefrom.

Shackles have been developed for holding the fowl by the legs and for releasing the fowl without requiring the manual lifting of the fowl. Such shackles normally are employed in the defeathering operation. These previous shackles, however, are of a relatively complex nature or involve devices that are biased either toward the fowl retaining or fowl releasing position by some form of spring means. Some shackles are constructed of spring wire and adapted to be closed by moving one part of the fowl retaining means over a shoulder or the like on the frame of the shackle to provide an over-center hold. These prior art devices are not conducive to rapid, efficient, automatic processing of the fowl. For the most part that include complex mechanisms adapted to open or close the shackles or include spring biasing means. The shackles employing the complex mechanisms are generally unsatisfactory due to cost of installment and maintenance. The spring biased shackles are subject to deterioration in the service conditions experienced in the processing of fowl. For example, the shackles are continually exposed to an atmosphere of relatively high temperature water. Such humid, high temperature conditions impose severe service demands upon the shackles. These operating conditions will, for example, contribute greatly to severe corrosion of the shackle, particularly stress corrosion if the material is in a stressed condition such as shackles having spring biasing means.

After the fowl has passed through the entire processing operation, it is necessary to remove it from the shackle for subsequent steps, such as packaging or the like. Manual removal of the bird, of course, requires that the bird be lifted from the shackle by hand. In a continuous process such as is involved here this operation can become especially tedious, in view of the fact that some of the birds involved in the processing may weigh from 20 to 30 pounds. It can readily be seen that manual removal of the birds is unsatisfactory. Generally, automatic removal of the birds, due to the severe service conditions imposed on the materials, is the most satisfactory and should be accomplished in the simplest manner feasible.

According to the preferred form of the present invention, a shackle including a frame member is provided with a vertically movable member. The movable member is adapted to grasp the legs of the fowl to thereby suspend the fowl within the shackle. The movable member is vertically movable between two positions. In one position the movable member, in cooperation with the frame member, defines nips to provide a leg engaging and retaining position and in a second or elevated position the movable member is adapted to release the legs and to allow the fowl to drop from the shackle. The shackle of the present form is provided with a head or neck receiving groove to provide means for positioning the bird in a substantially horizontal position for convenience in eviscerating or as required for inspection.

The preferred form of the shackle of the present invention is characterized by a construction having a rigid frame member with a movable retaining member disposed within and guided by said rigid frame member. The movable retaining member in fowl retaining position defines in combination with the frame a pair of rigid laterally spaced leg retaining nips. The movable member is characterized by spaced parallel bar portions at the upper and lower portions thereof to define guiding surfaces, said upper and lower spaced parallel bar portions being joined by a unitary continuously formed bar section to complete the structure. The lift bar at the upper portion of the movable member does not extend beyond the lateral width of the upper bar portion and thus avoids extensions which may be caught on ancillary equipment during the processing operation.

It is accordingly, a general object of the present invention to provide an improved shackle wherein automatic releasing of the fowl is accomplished without manually lifting the fowl from the shackle.

A further object of the present invention is to provide an improved shackle that is capable of suspending the fowl in the various positions requires during the complete processing operation. A still further object resides in the provision of an improved poultry shackle having a vertically movable fowl retaining member defining upper and lower guidably received saddle portions and lift means associated therewith, said lift means adapted to be simple and rigid in construction and, when assembled, in confined relation within the upper saddle portion of said shackle so as to avoid protrusions that could be intercepted by ancillary equipment during the processing cycle.

Another object of the present invention resides in the provision of an improved poultry shackle for the processing of poultry having leg and neck retaining portions thereon, said shackle being adapted to position the bird such that the dorsal is tipped slightly upwardly for inspection of the bird.

An additional object of the present invention resides in the provision of an improved shackle for fowl in which the fowl may be conveniently and rapidly attached merely by inserting the legs thereof in a leg receiving nip or slot.

The novel features which I believe to be characteristic of my invention are set forth with particularity in the appended claims. My invention itself, however, together with further objects and advantages thereof, will best be understood by reference to the following description taken in connection with the accompanying drawings, in which:

FIGURE 1 illustrates the shackle of the present invention, showing the poultry retaining position of the vertically movable member in solid lines and the releasing position in dashed lines;

FIGURE 2 is a side elevational view of the shackle of FIGURE 1 illustrating by dashed lines the releasing position of the vertically movable member;

FIGURE 3 is an enlarged fragmentary side elevational view of the shackle of FIGURE 1 illustrating in phantom the lifting pin used to raise the movable member of the shackle to effect release of the fowl; and, FIGURE 4 is a schematic representation of one type of lifting means that may be used to actuate the movable member of the shackle.

Referring more particularly to FIGURE 1, there is shown a shackle for suspending fowl indicated generally at 10. The shackle is comprised of a frame member 12, substantially quadrilateral in outline, although it should be understood that the configuration of the outline may be varied without materially affecting the operation of the shackle.

A shackle support or shackle suspension member 14 is rigidly attached to the shackle 10 at the top side 16 thereof. The suspension member 14, for convenience, is formed in the shape of an inverted U and preferably welded to the top bar 16 of frame member 12. The inverted U-shaped suspension member 14 defines a pair of guide rails 18 and 20 which guide rails extend below the top bar 16 of frame member 12 for a distance. It should be noted that other modifications of the configuration and construction of the suspension member are possible and that the forms shown herein are merely included for purposes of illustration. The bottom portions 22 of each of the sides of the shackle 10 are tapered inwardly toward the central portion of the shackle 10. The bottom of the shackle 10 is interrupted and a V-shaped bar 24 is inserted in the interruption, and preferably welded to the frame 12 of the shackle 10. As shown in FIGURE 1, the portions of the bottom bar of frame 12 are bent downwardly adjacent the interruption in the frame. This provides additional area to which the V-shaped member may be attached by welding to provide a strong, rigid, unitized frame member. As shown, the V-shaped bar is flared generally outwardly adjacent the upper terminal portions thereof, as indicated at 26. The flared position, as at 26, permits the head or neck of the fowl to be conveniently and readily introduced therein without requiring undue attention to the problem. In production line processes, such as are involved in the processing of fowl, it is essential that each operation or characteristic thereof be adapted for quick, accurate performance.

A fowl-retaining member, indicated generally at 28, is slidably positioned upon the supporting and guiding surfaces of the frame 12. The retaining member 28 is defined by a shallow V-shaped portion 30 at the bottom thereof, the V-shaped bottom extending continuously upward through curve 31 into portion 32 thence tapering gradually inwardly to spaced relation at the upper terminal thereof as shown at 34 in FIGURE 1. The upper and lower portions of the retaining member 28 are formed of a pair of bars 36 and 38, as indicated in FIGURE 2.

The bars 36 and 38 are disposed one on either side of the frame 12 and are integrally joined at the lower extremity thereof by a lug 40 which is preferably welded to each of the bars 36 and 38. Portion 30 (FIGURE 1) also defines a saddle-like configuration as shown in FIGURE 2.

A lift bar 42 is inserted into the space 34 between the upper terminals of the bars 36 and 38. The lift bar 42 is preferably welded to each of the bars 36 and 38, thus joining the bars at the top as well as the bottom and caging the fowl retaining member 28 upon the frame 12. Lift bar 42 is contained entirely within the confines of space 34 which is defined by the upper portions of bars 36 and 38. Lift bar 42 is adapted to be engaged by suitable tripping devices functionally represented in FIGURE 3 and which are adapted to lift the bar 42, and thereby lift the fowl retaining member 28 to the position shown by the dashed lines in FIGURE 2. It can readily be seen that as the lift bar 42 is raised by the tripping mechanism, schematically illustrated in FIGURE 3, the lift bar 42 and the vertically movable fowl retaining member 28 will be guided upwardly by the guide bars 18 and 20. It is important to keep the fowl retaining member 28 substantially centered within the frame 12. If it is not centered, the fowl may be released too early, or it may not be engaged at all by the retaining member, or the retaining member 28 may engage only one leg of the fowl, depending, of course, upon the degree of displacement of the fowl retaining member from the central area defined by the frame 12. For example, if the fowl retaining member 28 were to be lifted in a skewed fashion, substantially displacing it from the central area defined by frame 12, then one leg of the fowl might be pinched while the other leg might be released. This could result in the tearing of one leg of the fowl which may give rise to rejection of the fowl on subsequent inspection. The lift bar 42 thus serves to keep the fowl retaining member 28 substantially centrally disposed within the area defined by the frame 12 so that the legs of the fowl are evenly grasped and so that both legs of the fowl are released evenly without pinching during the releasing operation.

The fowl retaining member 28 is further restrained and guided at the bottom portion thereof by the sliding action of the bottom members of the movable member 28 upon the V-shaped bar 24 and the bottom bar of frame 12 of the shackle 10. The guiding action inherent in this assembly restrains even limited rotation of the fowl retaining member 28 about the vertical axis and confines its sliding vertical movement to a single plane defined by its periphery.

The tapered portion 22 of the bottom of each of the side members of frame 12 is included to provide a wedging action in cooperation with the fowl retaining member 28.

The legs of a fowl are retained within the nip or slot 44 formed by the sides of the fowl retaining member 28 and the frame member 12. Positioning of the legs of the fowl within the slot 44 by the knee joint is usually done for the purposes of evisceration and inspection of the bird, it being noted, of course, that for both operations the neck of the bird will be placed within the V-shaped opening defined by the member 24 so that the bird will be supported in a substantially horizontal position within the shackle, the dorsal portion of the bird being elevated slightly from the horizontal.

Release of the fowl from the shackle 10 is realized by vertically raising the fowl retaining member 28 along its guiding surfaces. It can readily be seen that the leg retaining slots 44, provided by the member 28 and frame 12 as in the solid lines of FIGURE 1, are not defined with member 28 in elevated fowl release position as represented by the dashed lines of FIGURE 1. With the fowl retaining member 28 in the position defined at 28', the legs of the fowl will slip off the lower bar of the frame member 12, there being nothing to restrain the legs. The weight of the bird alone will be sufficient to release the bird from the shackle with the member 28 in the raised position.

When the retaining member 28 is moved vertically upwardly to effect release of the fowl confined within the shackle, there is no abrasion of the legs of the fowl since the slot rapidly and continually widens during upward movement of said retaining member. When the member 28 is in the fully lowered, retaining position, it, in combination with the inwardly tapered portion of the frame member 12, defines a substantially uniform slot portion 44 along a distance of the respective member. As soon as the member 28 begins to move upwardly, the inward curvature of the lower portion of said member, in combination with the outwardly tapering portion of the frame member 12 of the shackle 10—with respect to upward movement of the movable retaining member 28—presents a rapidly widening slot 44 on each side of the member 28. With this construction there is no tendency for the bars 36 and 38 of the movable member to slide in abrasive fashion against the legs of the bird and thus there is no tendency for the bars 36 and 38 to tear the skin of the legs.

It should be observed that with the construction of the present invention, the movable member effects a removal of the retaining slot rather than lifting the bird out of the slot. As can readily be seen, when the movable member 28 is lifted to an elevated position the bird will not be "lifted" out of the shackle but will simply drop therefrom when the retaining slots have been removed. As the movable member moves upwardly defining a continuously increasing slot 44, one of the legs of the fowl will drop from the shackle retaining position. As soon as one leg of the fowl drops away from the shackle, the movable member 28 is free to move laterally into the space vacated by the leg that has dropped away to quickly release the other leg from the opposite slot. Thus, both legs of the bird are released substantially simultaneously. Lateral movement of the movable member 28 can occur once and the member has moved upwardly to the extent that the lug 40 is free of the lower portion of the V-shaped member 24. It should be understood, of course, that the total lateral movement of the movable member 28 is dependent upon the vertical position thereof in that the lug 40 is still confined within the upwardly diverging V-shaped guiding member.

The weight of the bird will tend to hold the shackle down and prevent it from coming off of the conveyor suspension portion when the movable member 28 is urged upwardly to release the bird. However, shackle holding means may be provided to prevent upward movement of the shackle, as a precautionary feature (such means being described below).

If the bird is suspended in the horizontal position prior to release thereof, the neck will be restrained by the V-shaped member 24. The neck of the bird being restrained by this member will not automatically discharge as will the legs. It is, therefore, necessary to provide means to lift the neck of the fowl from the member 24 in order to release the bird from the shackle. This lifting action is accomplished by the shallow V-shaped portion 30 of the fowl retaining member 28. When the member 28 is lifted to effect a release of the bird, the portion 30 will engage the neck of the bird to thereby lift the same out of the groove defined by the member 24. Once the neck of the bird is lifted upwardly within the member 24 to a point where the head can pass through, the weight of the bird will be sufficient to permit the bird to drop from the shackle. It is apparent that the center of gravity of the bird is at all times below the lowermost portion of the shackle and the bird will drop from the shackle of its own accord, unless it is restrained in the fashion hereinabove described. It will be noted that the shallow V-shaped portion 30 of the member 28 extends into the flaring portion 26 of the V-shaped member 28 when the member is in the uppermost position defined in FIGURE 1 at 28'.

Thus, it can readily be appreciated that the form of shackle of FIGURE 1 of the present invention is a rigid unit that is economical to manufacture. Since the shackle is not spring biased toward the fowl retaining or releasing position, there is no spring action to deteriorate over a period of use of said shackle. An additional feature, of course, resides in the simplicity of construction and operation of the automatic releasing feature of the shackle. It can readily be seen that by guiding the movable member 28 at spaced points at the lower portion thereof, rotation of the member 28 is prevented with respect to the frame member 12 of the shackle 10. Another benefit of the lower spaced guiding portions of the shackle resides in the fact that the central portion of the shackle is open and adapted for inclusion of the neck retaining portion 24 for positioning of the bird in the substantially horizontal position for evisceration and inspection.

FIGURE 4 schematically illustrates the operation of the lift mechanism to effect lift of the fowl retaining member 28. The raising of the fowl retaining member 28 (not shown in FIGURE 4) being accomplished by means of a suitable lift bar actuator 46 shown by dashed lines. The lift bar actuator engages the lift bar 42 (not shown) so that an upward movement of the actuator 46 causes a corresponding upward movement of the lift bar 42 and the fowl retaining member 28 to a fowl releasing position 28' (FIGURE 1).

As shown in FIGURE 3, the lift bar actuator 46, which may be associated with the lift mechanism shown and described in FIGURE 4, is adapted to engage the lift bar 42 and the fowl retaining member 28 and then to effect repositioning of the member 28 from a first position wherein the fowl is retained by the shackle assembly to a second position defining fowl releasing position (28').

The lift bar actuator 46 is adapted to engage the lift bar 42 by means of, for example, a mechanism illustrated in FIGURE 4 and described in more detail hereinbelow, wherein the lift bar 42 and the fowl retaining member 28 associated therewith are engaged in a fowl retaining position defined by the sides of the frame member 12 and the fowl retaining member 28 and raised to a fowl releasing position defined by the dashed lines shown in FIGURE 1.

The lift bar actuator 46 may be operated by various mechanisms, the details of which form no part of the present invention. By way of illustration, an apparatus such as is shown generally in FIGURE 4 may be used for this purpose. In this apparatus the lift bar actuator 46, FIGURE 3, is moved into the actuating position (lower position as seen in FIGURE 3), lifted to elevated bird releasing position (upper position as seen in FIGURE 3), and withdrawn, during the course of a single rotation of the lift bar actuator disk 50.

More particularly, as shown in FIGURE 4, the lift bar actuator disk 50 is rotatably supported by shaft 56, which is on an axis perpendicular to the plane of movement of the lift bar actuator 46 as seen in FIGURE 3. The disk is rotated is rotated by the drive mechanism which can be traced from the disk 50 to the drive shaft 58 and thence to the driven pulley 60. The latter receives the drive belt 62, which is driven by the electric motor 64 through an appropriate sheave as shown. The motor 64 is, for purposes of illustration, a D.-C. motor suitable for energization by the battery (or other source of electric power 66'. The circuit to the motor 64 may be traced from the battery 66', through the motor 64, to the switches 52 and 54 in parallel circuit relation. Accordingly, the motor 64 is energized whenever either one or both of the switches are in closed or circuit-making position.

The disk 50 is driven in a single full revolution when the conveyor brings the shackle unit to the dwell position. To this end, the switch 52 is momentarily closed by suitable mechanism responsive to the position of the shackle in the dwell position. For example, the switch 52 may be of the type that momentarily closes and then reopens when an operating arm on the switch is depressed, and the switch may be positioned to be engaged by the shackle as it reaches the dwell position. Alternatively, the conveyor that moves the shackle may include cam or other drive elements that close switch 52 when the shackle is in the dwell position. Still another alternative is to locate the switch 52 to be wiped by the shackle as it approaches the unloading dwell position, so that the movement of the shackle itself momentarily closes the switch 52.

Once the switch 52 is momentarily closed, the disk 50 is driven to swing the lift bar actuator 46 beyond the switch 54. The latter is closed when released, thus defining an alternative energizing circuit for the motor 64. The motor continues, therefore, to be energized while the disk 50 makes a full rotation. When the full rotation comes to an end, the lift bar actuator 46 engages the switch 54 as shown in FIGURE 4, thereby opening switch 54 and breaking the energizing circuit to the motor 64.

The switch 54 is actuated when the arm 54a is swung to the left hand direction as shown in FIGURE 4. The arm includes releasible elements (such as a spring support) that swing out of the path of the lift actuator 46 when the disk 50 is rotated by the motor 64.

The lift bar actuator 46 is pivotally supported on the disk 50 for rotation about the axis of support pin 46a. The latter is suitably supported on the disk 50 by means not shown. A spring 66 is affixed to the disk 50 and bears against the back side of the lift actuator 46 to hold the same normally in the radial orientation shown in the full lines of FIGURE 4. However, when the lift actuator 46 encounters predetedmined resistance, the bias of the spring 66 is overcome and the lift actuator swings towards the circumferential position. This is shown in the dotted lines of FIGURE 4, where, in the upper position shown, the lift bar actuator 46 has lifted the lift bar 42 to the limit of its upward movement and swings counterclockwise on the pin 46a to pass the lift bar. It will be noted that the lift bar is now freed to return to its original lowered position and the disk 50 is free to complete its rotation.

It should be observed that the area defined between the side members 32 of the vertically movable fowl-retaining member is substantially wide for a considerable portion of its height extending from the lower saddle-like portion 30 of the member for about one-half of the total height of the member. It can readily be seen that the placement of the shackle with respect to the tripping mechanism need not be critical in view of the fact that the tripping lever need only be positioned such that it initially enters the vertically movable portion of the shackle at the wide area portion thereof. In this manner the shackle may be within several inches to either side of the exact center position and it still will be in position to effectively be operated by the tripping mechanism since the tripping lever will, in effect, guide the shackle during vertical travel of the lever until the vertically movable portion is lifted by the lever and the tripping mechanism de-energized. Without this wide area portion in the vertically movable member it can readily be seen that the positioning of the shackle with respect to the tripping mechanism would be rather critical. The critical positioning requirement of the conveyor carried shackle would be unsatisfactory for economical use and as such would be unacceptable.

The poultry shackle disclosed herein is an improvement of the shackle disclosed and claimed in my copending application Serial No. 161,103, filed December 21, 1961.

While I have shown and described a specific embodiment of the present invention, it will, of course, be understood that other modifications and alternative constructions may be used without departing from the true spirit and scope of this invention. I intend therefore by the appended claims to cover all such modifications and alternative constructions as fall within their true spirit and scope.

What I claim as new and desire to secure by Letters Patent of the United States is:

1. An improved automatic fowl-releasing shackle adapted to be suspended on a traveling conveyor and effective to release the fowl from the shackle at a predetermined point of conveyor travel, said shackle comprising:

a frame member defining top, bottom and side portions, said top portion having conformations adapted to be received on said conveyor to suspend the shackle therefrom;

a substantially V-shaped fowl head receiving member affixed to the bottom portion of the frame and extending therefrom toward the top portion of the frame, said head receiving member being defined by spaced arms in varying relative spaced relation, said arms being in close spaced relation adjacent the bottom of the frame member and diverging toward the frame top to greater spaced relation;

a fowl retaining member mounted for reciprocal movement on said frame, said fowl retaining member being defined by a pair of formed members joined to each other at their mid-sections, respectively, and in relative spaced relation at the terminals thereof, one of said terminals defining a saddle-like portion received by the bottom of the frame to define the stop for fowl-retaining position of the movable member, the saddle-like portion having a guide member thereon receivable between the arms of the fowl head receiving member, said movable member in combination with the sides and bottom of said frame defining fowl-retaining nips when in a first, fowl-retaining position, said nips being defined by a predetermined spacing between the movable member and frame sides, respectively, to prevent injury to the fowl, and defining fowl-releasing spaces when the movable member is in a second position wherein the saddle-like portion is spaced from the bottom of the frame; and a lift bar integrally affixed to the upper spaced terminal portion of the movable member, the length of said lift bar being substantially equal to the space defined at the upper section of said movable member, said lift bar being effective to raise the fowl-retaining members upon the application of an external force thereto to release the fowl at a predetermined position of conveyor travel.

2. An improved automatic release shackle for fowl adapted to be pendulously suspended on a traveling conveyor and effective to release the fowl from the shackle at a predetermined point of conveyor travel, said shackle comprising:

a frame member having sides, a bottom and conformations adapted to be received on the conveyor to suspend the shackle pendulously therefrom, said frame member further defining fowl head receiving means affixed to said bottom opposite said conformations, the fowl head receiving means including spaced arms, the space between said arms being of varying lateral distance, said arms being in close spaced relation adjacent the frame bottom and diverging therefrom into spaced relation;

a movable member supported by said frame member for vertical movement therealong, said movable member characterized by a pair of bars joined at their mid-sections, respectively, and being in spaced relation at the terminals thereof, one of said terminals defining a saddle-like portion, said movable member being operable from a first position wherein the movable member and the frame co-operatively define fowl-holding nips between the sides of said frame and the movable member to retain the fowl within the shackle, to a second position effective to define fowl-passing spaces to release the fowl from the shackle, said nips being defined by a predetermined spacing between the movable member and frame sides, respectively, to prevent injury to the fowl, said movable member having guide means extending into the head receiving means of the frame to orient said movable member with respect to the frame sides, said guide means being freely movable laterally within the fowl head receiving means to orient the movable member in the first position with the sides thereof in substantially uniform spaced relation to the frame sides to define said fowl-holding nips with the guide means of said movable member disposed in the close spaced portions of said fowl head receiving means, and in the second position where the guide means may move laterally within the spaced distance defined between the arms of the head receiving means to permit lateral movement of the movable member toward either frame side to define a wide fowl-passing space along one side and a relatively narrow fowl-passing space along the other side; and a lift member rigidly attached to said movable member and adapted vertically to urge the movable member to said second position upon the application of an external force thereto.

References Cited in the file of this patent

UNITED STATES PATENTS 3,044,109     Wayne _____ July 17, 1962

FOREIGN PATENTS 136,525     Russia _____ Mar. 14, 1961